UNITED STATES PATENT OFFICE.

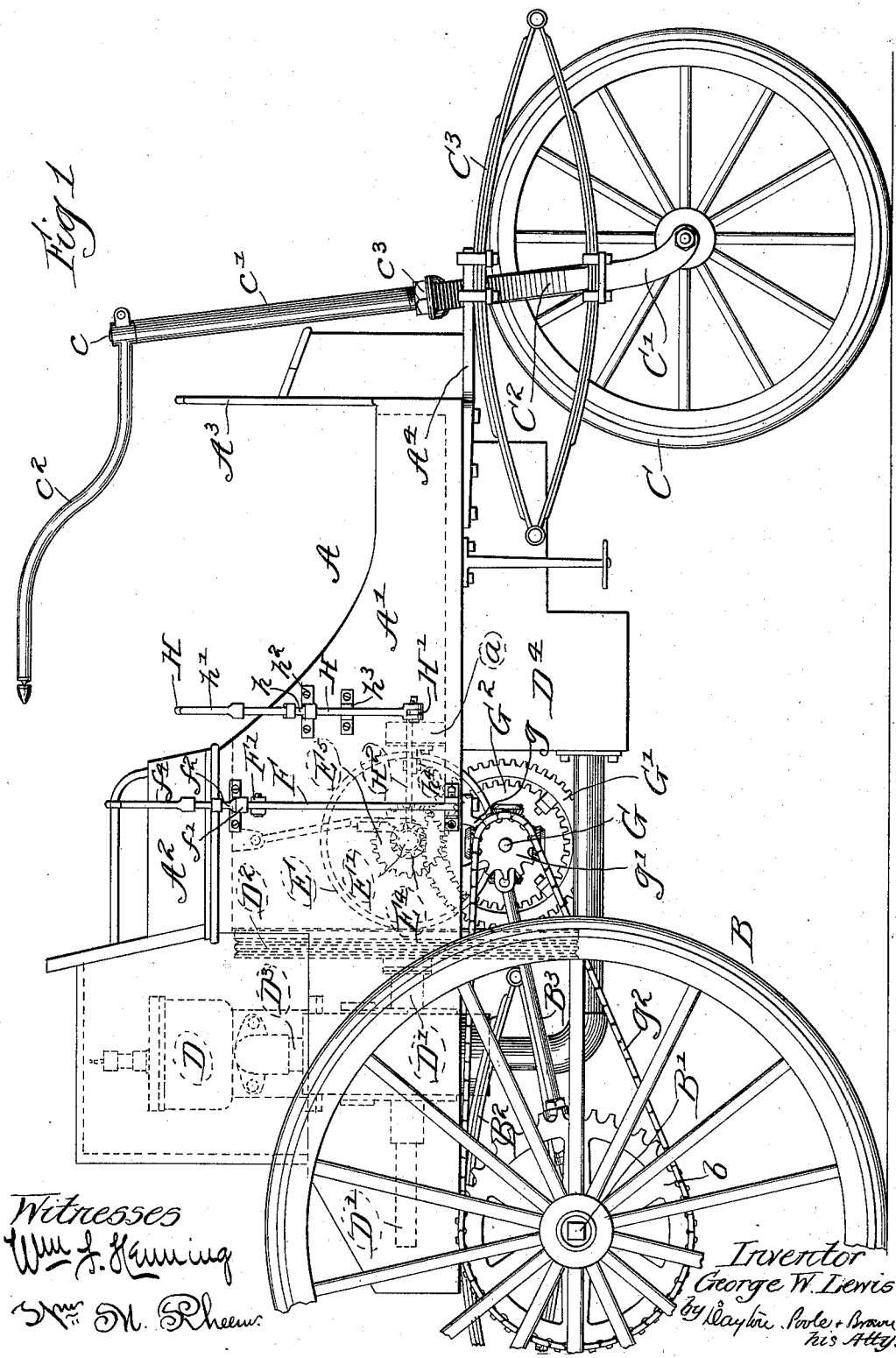

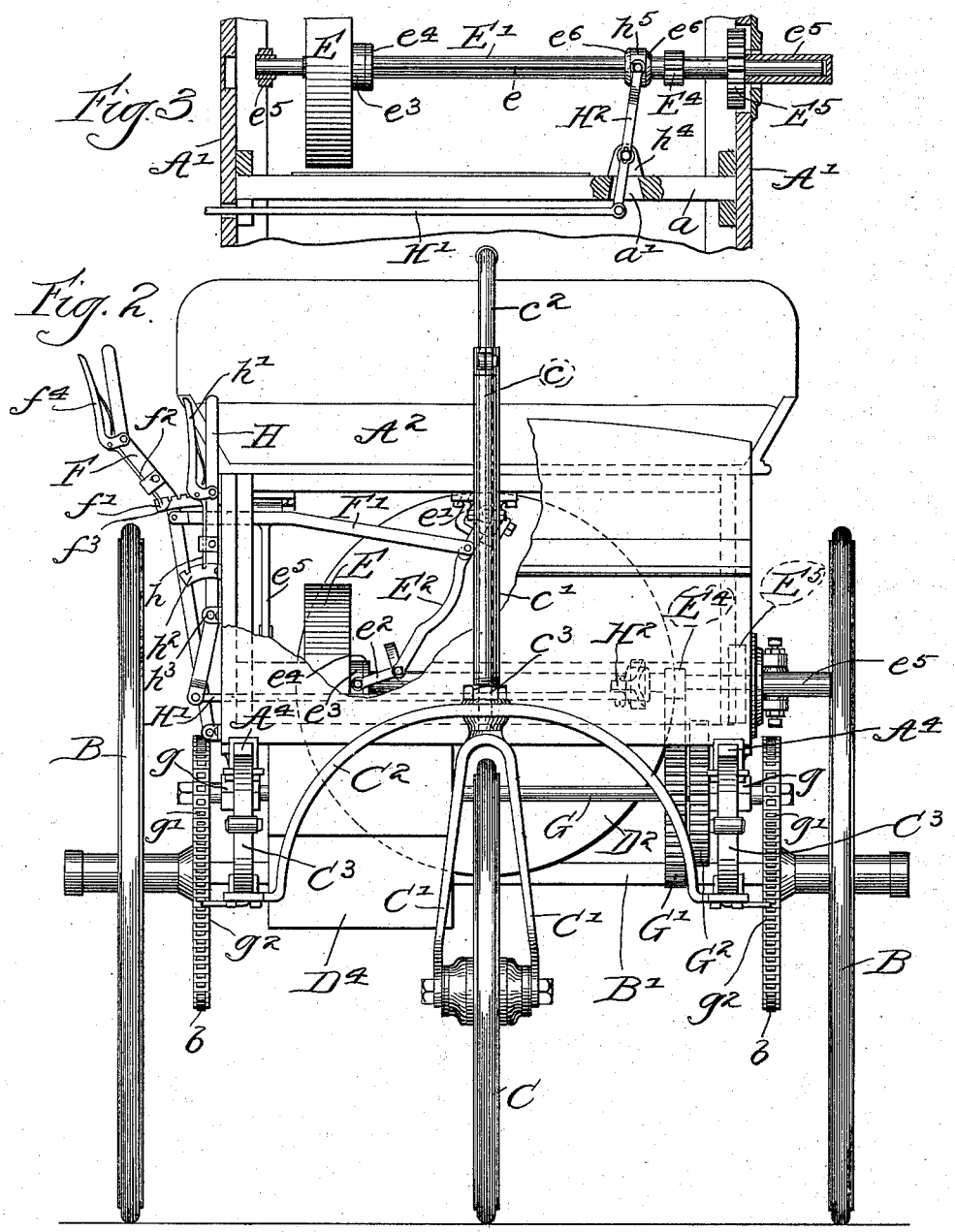

GEORGE W. LEWIS, OF CHICAGO, ILLINOIS.

VEHICLE-MOTOR.

SPECIFICATION forming part of Letters Patent No. 609,443, dated August 23, 1898.

Application filed July 10, 1895. Renewed January 28, 1898. Serial No. 668,350. (No model.)

*To all whom it may concern:*

Be it known that I, GEORGE W. LEWIS, of Chicago, in the county of Cook and State of Illinois, have invented certain new and useful Improvements in Vehicle-Motors; and I do hereby declare that the following is a full, clear, and exact description thereof, reference being had to the accompanying drawings, and to the letters of reference marked thereon, which form a part of this specification.

This invention relates to improvements in power-driven vehicles of that class which are actuated by gas or steam engines or other motors, and it relates more particularly to improvements in the running-gears of such vehicles and in the driving and actuating connections by which the power is transmitted from the motor to the driving-wheels.

The invention consists in the matters hereinafter set forth, and particularly pointed out in the appended claims.

In the accompanying drawings, Figure 1 is a side elevation of a light motor-driven road-wagon constructed in accordance with my invention. Fig. 2 is a front elevation thereof with the dashboard partly broken away. Fig. 3 is a fragmentary plan sectional elevation of the main counter-shaft and the means for shifting the same endwise.

In said drawings, A designates the body of the vehicle, the same being made of rectangular shape in plan view, with side walls $A'$, upon which a transverse seat $A^2$ is supported about midway of the length of the vehicle.

B B designate the driving-wheels, which are journaled at the sides of the wagon-body upon the opposite ends of the transverse axle $B'$. The latter passes beneath the rear end of the body A and supports the same through the medium of interposed springs $B^2$. The front end of the body A is in my present improvement supported upon a single steering-wheel C, which is located centrally at the front of the frame. Said steering-wheel is journaled between the lower ends of forks $C'$, which are united above the wheel and are there attached to a pivot-spindle $c$. The latter extends upwardly through a transverse arched bar $C^2$ and through an elongated bearing $c'$ on the upper part of said bar to a point just above the top of the dashboard and is provided at its upper end with a rigidly-attached steering-handle $c^2$, which extends rearwardly to within convenient reach of a person occupying the seat $A^2$. The bearing $C^2$ is formed by a pipe or tube that is secured to the arched bar $C^2$ by being screw-threaded at its lower end to enter a screw-threaded aperture in said bar and by means of a jam-nut $c^3$, provided on the tube above the bar. Said arched bar depends at its outer ends beneath elliptic springs $C^3$, which are interposed between said bar and forwardly-extending arms $A^4$, that are bolted to the under side of the wagon-body. With this construction the steering-wheel C is conveniently made of considerable size and is provided with a long steering-head without interfering with the wagon-body or necessitating its being placed greatly in advance of said body, while at the same time provision is made for the interposition of springs between the wheel and body in a most satisfactory manner.

D designates the motor, which, as herein indicated, is a vapor-engine of the explosive type, using gasolene or other light hydrocarbon for fuel, although in so far as the present invention is concerned said motor may be of any other type of prime mover found suitable for the purpose. Said motor is located in the rear portion of the wagon-body, behind the seat $A^2$, and is arranged with its shaft $D'$ extending lengthwise of the vehicle. At its front end the shaft is provided with a fly-wheel $D^2$, the front face of which is made flat and is adapted to be engaged by an adjustable friction-wheel E. The latter is mounted to slide on a feather $e$ upon a transverse counter-shaft $E'$ and serves to transmit rotary motion to said shaft in either direction and at varying rates of speed, according as it is moved to one side or the other of the center of the fly-wheel and according to the distance at which it is adjusted from said center.

For shifting the friction-wheel E lengthwise of the shaft $E'$ mechanism is provided as follows:

$E^2$ designates a swinging arm secured at the upper end of the seat $A^2$ or other fixed part of the vehicle-frame by a universal joint $e'$. The lower end of the arm $E^2$ depends at one side of the shaft $E'$ and is pivotally connected to one end of a short link $e^2$. The opposite end of said link is pivotally secured to an annular sleeve $e^3$, which is seated in a groove in the hub $e^4$ of said friction-wheel E.

F designates a hand-lever which is pivotally secured at its lower end to a lug located on the side of the wagon-body, near the lower edge thereof. Near its upper end the lever F is guided within a slotted segment-bar $f'$ and is provided with a sliding pawl $f^2$, which is adapted to engage either of a plurality of notches in said bar, said pawl being operated in the usual manner by a spring-pressed hand-latch $f^4$ on the lever. A link-bar F' connects the lever F with the arm $E^2$ and serves to oscillate said arm, so as to slide the wheel E lengthwise of the shaft E' when the lever F is shifted. Said link F' is pivotally attached to the lever F about midway of the length of the latter, but is attached to the arm $E^2$ near its upper or stationary end. A comparatively slight movement of the lever F will therefore produce a considerable movement of the wheel E, and the entire throw of the lever need not be very great in order to shift said wheel entirely across the face of the fly-wheel. The engagement of the pawl $f^2$ with the notches $f^3$ of the segment-bar will obviously secure the lever, and consequently the friction-wheel, in any adjusted position desired. The counter-shaft E' is herein shown as journaled in pivotally-supported bearings $e^5$ $e^5$ after the manner more particularly illustrated in my concurrent application, Serial No. 522,880, filed September 13, 1894, and is designed to be shifted horizontally to throw the wheel E into and out of engagement with the fly-wheel by means of a suitable shifting mechanism, such as the foot-lever and its connections shown in said concurrent application. These devices, however, form no part of my present invention and are accordingly not illustrated herein.

Rotary motion is transmitted from the counter-shaft E' to a parallel counter-shaft G, journaled in bearing-boxes $g$ $g$ below the bottom of the wagon-body, by a suitable change-speed gearing embracing gear-wheels G' $G^2$, fixed on the shaft G, and pinions $E^4$ and $E^5$, fixed on the shaft E'. Said pinions $E^4$ and $E^5$ are located a distance apart considerably greater than the distance between the gears G' $G^2$ and are alternately brought into engagement with said gears by the shifting of the shaft E' lengthwise in its bearings $e^5$. Such horizontal movement of the shaft E' is accomplished by means of a hand-lever H, located on the side of the wagon-body adjacent to the lever F and provided with a pawl $h$ and hand-latch $h'$, by which it may be locked in adjusted position to a notched segment $h^2$. Said lever H is pivoted midway of its ends to a lug $h^3$ and at its lower end is pivotally connected with an inwardly-extending link H', which is attached at its opposite end to an oscillatory arm $H^2$. The latter is also pivoted between its ends to a lug $h^4$ on a transverse bar $a$ of the wagon-body, and, as herein shown, its forward end projects through an aperture $a'$ in said bar to engage the link H'. The forward end of the arm $H^2$ is bifurcated to pivotally engage the opposite sides of a loose collar $h^5$, which is seated in an annular groove between two fixed collars $e^6$ on the shaft E'. Obviously with this construction the shaft E' may be shifted longitudinally by shifting the hand-lever H. When said lever is thrown over in one direction, it moves the shaft E' so as to bring the pinion $E^4$ and gear G' into mesh with each other, and when thrown over into the opposite direction the pinion $E^5$ is brought into mesh with the gear $G^2$. The gear G' and pinion $E^3$ are made respectively larger and smaller than the gear $G^2$ and pinion $E^4$, and the relative velocity of the counter-shaft G is therefore greater when the latter gear and pinion are in mesh. The counter-shaft G is provided at its opposite ends with sprocket-gears $g'$, which are connected by sprocket-chains $g^2$ with sprocket-gears $b$ on the hub of the driving-wheel B, and thus transmit the rotary motion to said wheels. The distance between the axle B' and the counter-shaft G is maintained constant by means of radius-bars $B^3$, which are pivotally secured to said axle and shaft at their opposite ends. The vibratory movement of the wagon-body on its springs therefore does not alter the distance between the sprocket-gears $g'$ and $b$, and consequently does not affect the driving-chains $g^2$.

$D^3$ designates the exhaust-pipe of the motor D, the same being directed downwardly and forwardly into a muffling-chamber $D^4$ of any suitable construction, which is secured beneath the forward end of the body A. Said muffling-chamber may be of any approved construction and is accordingly not specifically set forth herein. The preferred form illustrated is, however, described and claimed in my application filed concurrently herewith.

I claim as my invention—

1. The combination with vehicle driving-wheels, the vehicle-body and the motor, of a driving-wheel comprising a friction-disk mounted to turn on horizontal axis arranged longitudinally of the vehicle-body, a shaft extending across the vehicle-body parallel with the face of the disk, a pulley mounted to slide endwise on the shaft and adapted for contact with the face of the disk and means for moving said pulley endwise on the shaft, embracing an arm which is pivoted to the body at one end and is connected with the pulley at its opposite or free end, a hand-lever pivoted to the side of the body at its lower end, so as to swing in a plane transverse to the side of the body, said hand-lever being provided with a spring-actuated detent adapted to engage a notched segment, and a link connected at one end with said lever above its pivot and at its opposite end with said arm at a point between the ends of the latter, substantially as described.

2. The combination with the vehicle driving-wheels and a motor, of a rotary friction-disk driven by the motor, a shaft arranged substantially parallel with the face of the disk and movable toward and from the same, a friction-pulley mounted to rotate with said shaft but movable endwise thereon and adapted to engage the face of said disk, an actuating-arm pivotally connected at one end to the vehicle by means of a universal joint and connected at its free end with said pulley, said universal joint affording lateral movement of said arm with the shaft when the latter is shifted toward and from the disk, a hand-lever provided with a spring-actuated detent adapted to engage a notched segment, a link connecting said hand-lever with said actuating-arm at a point intermediate of the ends of the latter and gearing connecting said shaft with the driving-wheels, substantially as described.

In testimony that I claim the foregoing as my invention I affix my signature, in presence of two witnesses, this 8th day of July, A. D. 1895.

GEO. W. LEWIS.

Witnesses:
C. CLARENCE POOLE,
ALBERT H. GRAVES.